H. A. KRUEGER.
POWER TIRE BOLT TIGHTENER AND CUTTER.
APPLICATION FILED NOV. 27, 1908.

947,578.

Patented Jan. 25, 1910.
4 SHEETS—SHEET 1.

Witnesses:
Gladys Walton.
Edna J. Gockel.

Inventor:
Helmuth A. Krueger,
By Hugh N. Wagner,
His Attorney.

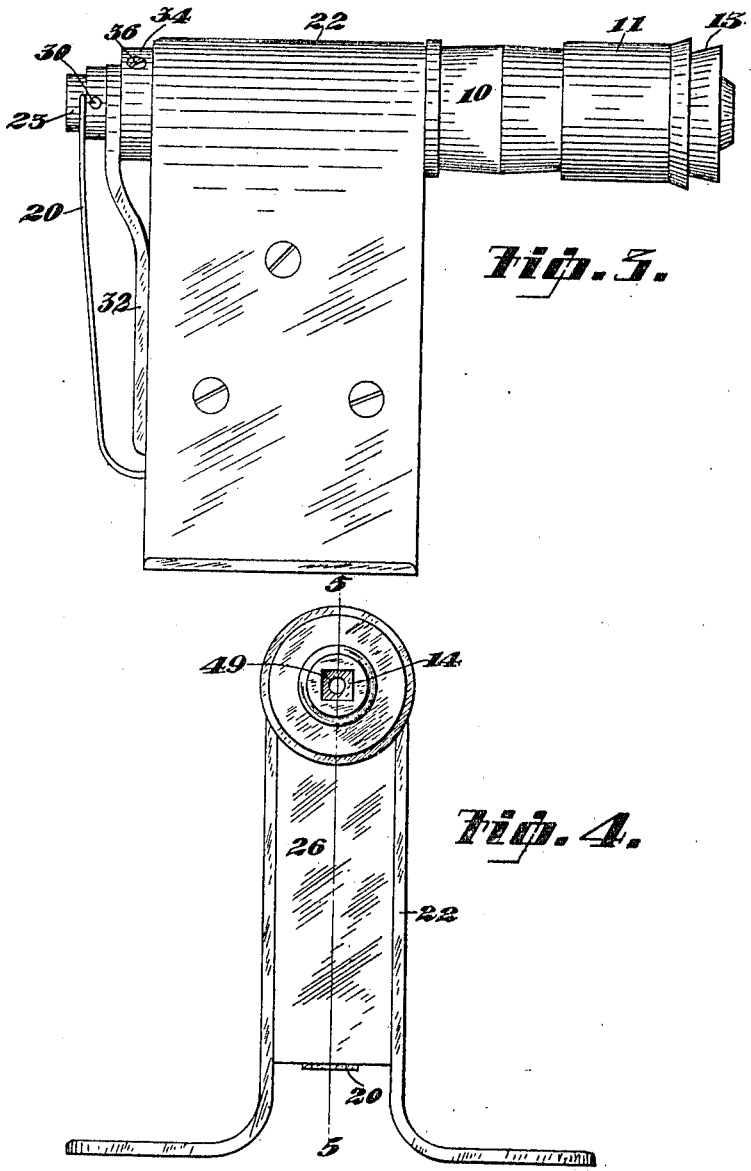

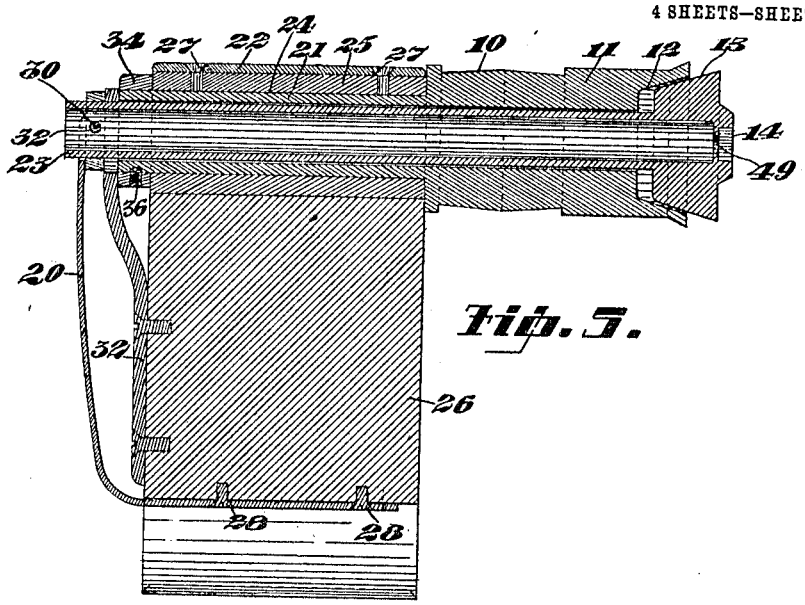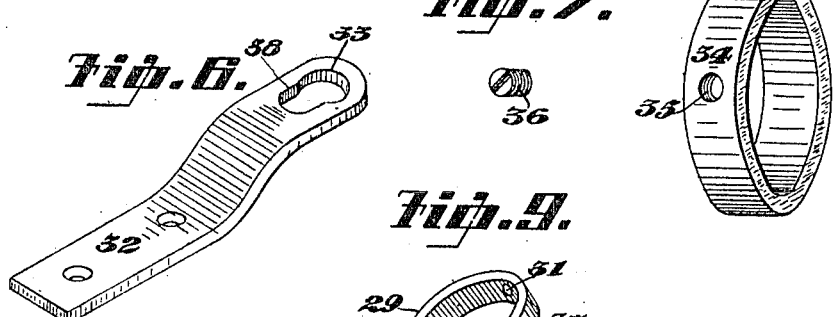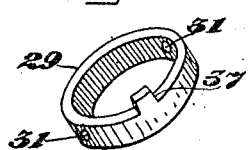

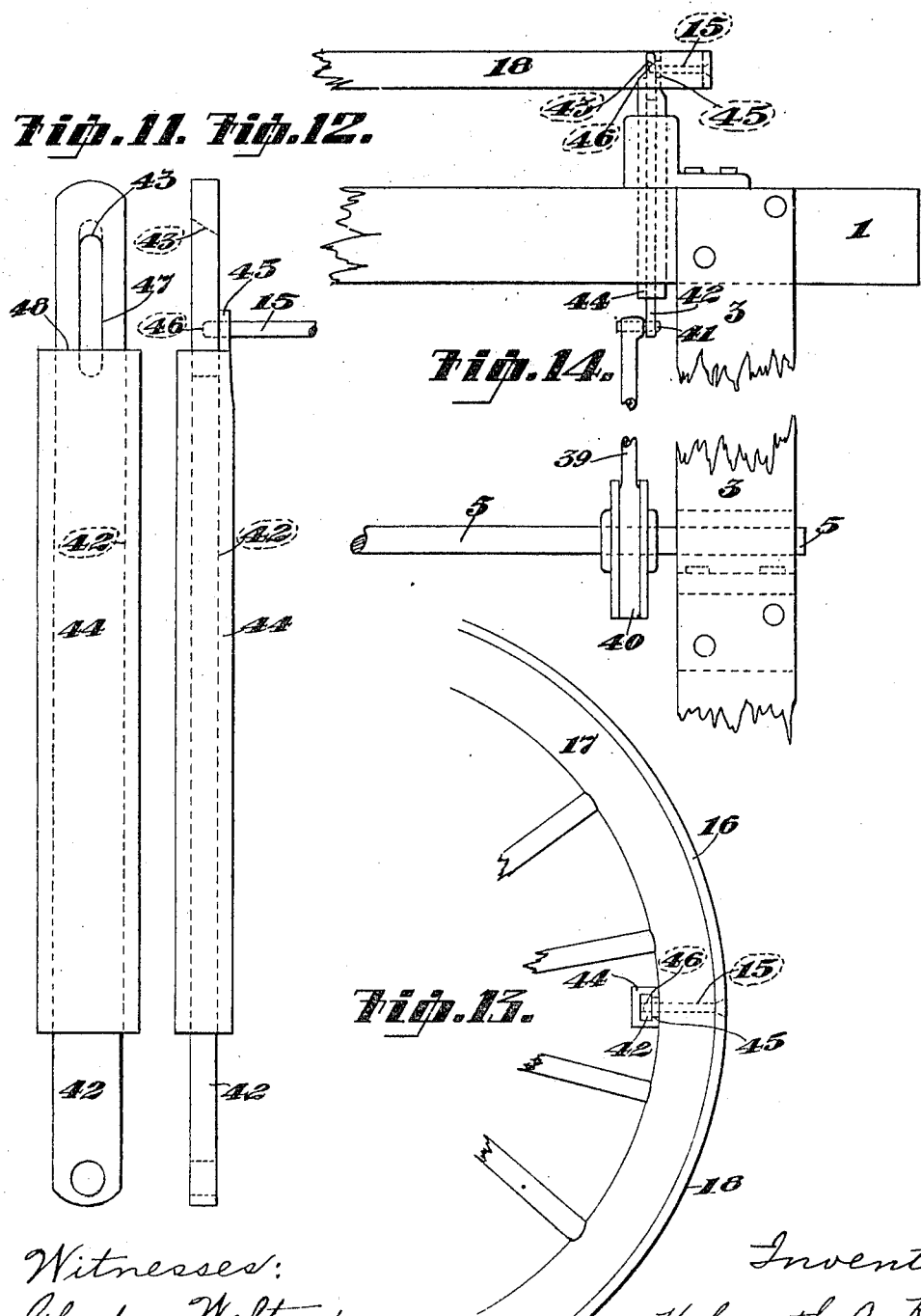

UNITED STATES PATENT OFFICE.

HELMUTH A. KRUEGER, OF ST. LOUIS, MISSOURI, ASSIGNOR OF ONE-HALF TO GEORGE H. SCHELP, OF ST. LOUIS, MISSOURI.

POWER TIRE-BOLT TIGHTENER AND CUTTER.

947,578.　　　　Specification of Letters Patent.　　Patented Jan. 25, 1910.

Application filed November 27, 1908. Serial No. 464,684.

*To all whom it may concern:*

Be it known that I, HELMUTH A. KRUEGER, a citizen of the United States, residing at the city of St. Louis, State of Missouri, have invented certain new and useful Improvements in Power Tire-Bolt Tighteners and Cutters, of which the following is a specification, reference being had therein to the accompanying drawings.

This invention consists in mechanism for tightening the nuts on tire bolts, and combined therewith mechanism for squaring said nuts and cutting off the ends of said bolts projecting beyond said nuts.

Figure 1:
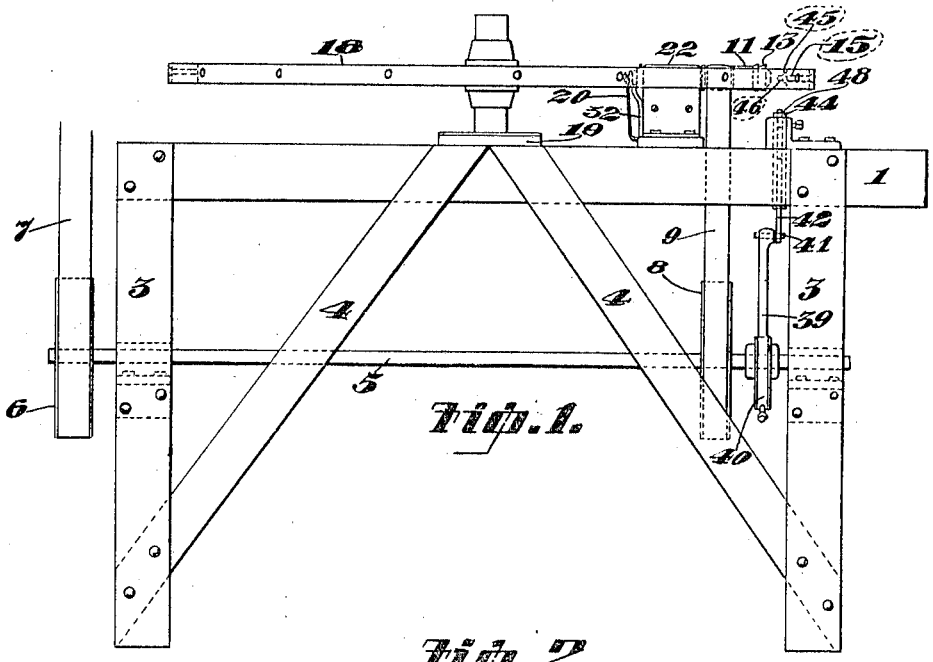
Figure 2:
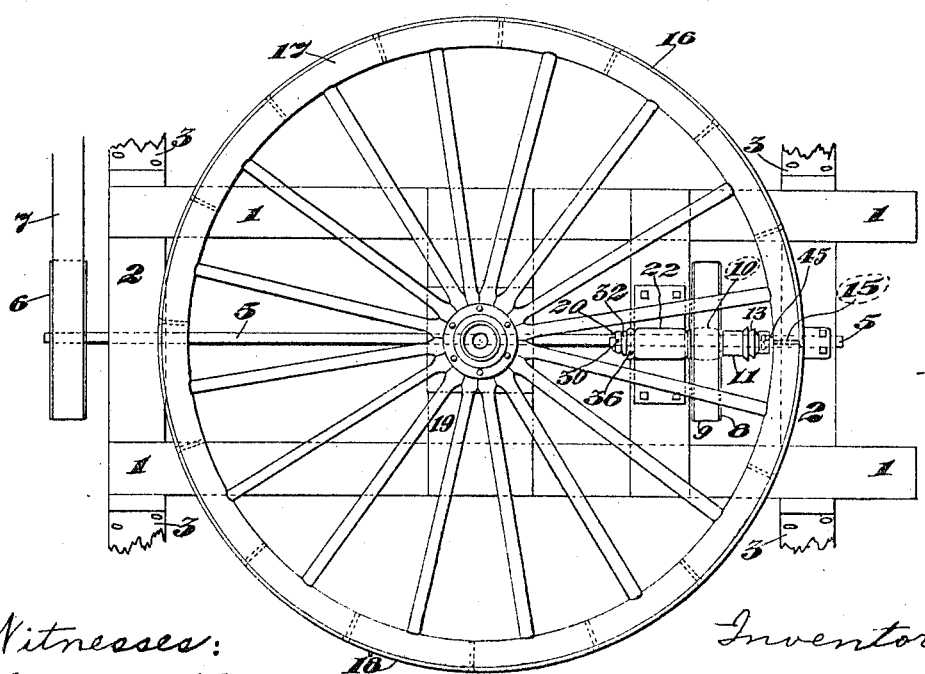

In the drawings forming part of this specification, in which like numbers of reference denote like parts wherever they occur, Figure 1 is a side elevation of the entire machine; Fig. 2 is a top plan view; Fig. 3 is a side elevation of the nut wrench; Fig. 4 is a view looking toward the left in Fig. 3; Fig. 5 is a sectional view on the line 5—5 Fig. 4; Figs. 6, 7, 8, 9, and 10 are detail views of parts connected with the nut wrench; Figs. 11 and 12 are views at a right angle to each other of the bolt cutter; Fig. 13 illustrates the same in its position relative to a wheel on the bolts of which it is intended to operate; Fig. 14 illustrates, on a scale relatively larger than that of Fig. 1, some of the details of the knife or cutter operating mechanism.

The main frame may be composed of either wood or metal, and preferably comprises beams 1, cross-pieces 2, standards 3, and braces 4. A shaft 5 is journaled in standards 3, and is driven by a pulley 6 by means of belt 7 coming from a suitable source of power. Another pulley, 8, is mounted on shaft 5 and driven thereby, and actuates belt 9, which passes over the friction surface 10 of a sleeve 11 containing a female friction cone 12. Male cone 13 coöperates with the female cone 12, and, when in engagement therewith, rotates when sleeve 11 is driven by belt 9. The protruding end of cone 13 is provided with a socket 14, squared to receive a nut located and "started" on a bolt 15, which is one of a plurality of similar bolts that have been run through the tire 16 and felly 17 of a wheel 18. The nuts having been "started" on all the bolts, the wheel is placed on the supporting member 19 of the main frame of the machine, and, with the friction cones 12 and 13 located between the spokes of the wheel, the wheel is moved toward said cones so as to cause one of said nuts to enter the socket 14. Pressure of the wheel against the projecting end of the male cone 13 forces the same farther into the female cone 12 against the pressure of spring 20, which normally tends to force said cones out of engagement with each other by bearing against the end or a part connected with the end of hollow shaft 23, which at its opposite end bears the male cone 13.

Cylinder 21 is supported by casing 22, as is, also, hollow shaft 23, said cylinder 21 bearing at one end sleeve 11 and friction cone 12, cylinder 21 encircling hollow shaft 23, and both passing through an opening 24 through cylinder 25, either formed integral, or closely associated, with casing 22. Said cylinder 25 may, for instance, rest upon a block 26, and be held tightly in engagement therewith by the top part of casing 22. Screws 27 pass through said top part of casing 22 to bind cylinder 25 in place. Spring 20 may be suitably fastened to the casing 22, or, as shown in Fig. 5, by screws 28 to block 26.

A convenient construction by which spring 20 can operate to keep the cones 12 and 13 out of engagement consists in the ring 29, which is fastened by pin 30 or the like to hollow shaft 23, said ring 29 and said hollow shaft 23 thus moving together, pin 30 passing through an opening or plurality of openings 31 in said ring 29 and through registering openings 32 in hollow shaft 23. A plate 32, containing an opening 33, affords a bearing for one end of hollow shaft 23. A ring 34, having a perforation 35 therethrough, encircles one end of cylinder 21, and a set-screw 36, passing through opening 35 and seated in a socket in cylinder 21, holds the same in a fixed longitudinal relation to the casing 22.

Cone 13 is prevented from accidental revolution by reason of chance contact with cone 12 by the lug 37 on ring 29, said lug seating in notch 38 of opening 33 in plate 32, except when, as hereinbefore described, the wheel is so pressed against cone 13 as to force the same into frictional contact with cone 12, at which time lug 37 will be pushed out of notch 38, leaving the hollow shaft 23 free to rotate, carrying cone 12 with it.

From the same shaft 5 which drives the nut tightener hereinbefore described is actuated the pitman 39, by means of the eccentric 40. A pin 41 connects said pitman to the shank 42, carrying a knife or shear 43, said shank sliding through guide sleeve 44.

After a nut 45 has been tightened on a bolt 15, an end 46 projects beyond said nut, and, in order to finish the wheel in a neat and marketable condition, it is necessary to shear off that end and, also, to true the nut to a certain line, for the purpose of having all the nuts regularly placed, so as to present a symmetrical appearance. To accomplish this, the end 46 of bolt 15 is caused to enter slot 47 at a time when the same is open above the top of sleeve 44. The rotation of shaft 5 and the action of eccentric 40 thereupon pull knife 43 downward against said end 46, but as said knife can not cut until the nut 45 rests upon the top edge 48 of sleeve 44, the preliminary pressure of cutting trues or squares said nut against said edge, and immediately thereafter the knife cuts through the end 46 of bolt 15, thus squaring and cutting at a single operation, which operation is performed from the same shaft that has previously actuated other mechanism to tighten said nut. The hole 49 communicates from the nut socket 14 to the interior of hollow shaft 23, affording a space in which the nut 45 of a bolt 15 can be inserted, while the end 46 is being tightened.

Having this described my said invention, what I claim and desire to secure by Letters-Patent is:

1. In a machine of the character described, the combination of an inner and an outer cylinder, the former bearing a male friction-cone and the latter a female friction-cone, a casing supporting both, a ring upon said outer cylinder for retaining the same in fixed relation to said casing, there being an opening through said ring and a socket in said outer cylinder, and a member passing through said opening and into said socket.

2. In a machine of the character described, means for tightening the nuts on tire bolts, and means for cutting the ends of said bolts including a guide sleeve adapted to have said nuts seat thereon, a slotted knife mounted in said sleeve for vertical reciprocation and adapted to have the bolt ends received therein, and means for actuating said knife.

3. In a machine of the character described, a driving shaft, means for tightening the nuts on tire bolts arranged to operate in a plane parallel with said shaft, a belt for driving said nut tightening means from said shaft, means for cutting the ends of the bolts arranged to operate in a plane at right angles to said shaft and said nut tightening means and independently of the latter, and means for reciprocating said cutting means from said driving shaft.

4. In a machine of the character described, a male and a female friction cone telescopically related, said male member having one end formed with a nut-receiving socket, a spring bearing against the opposite end of the male member to normally retain the same out of engagement with the female member, said female member being formed with an exterior belt engaging surface, and a belt engaged with said surface whereby the female member may be rotated.

5. In a machine of the type set forth, a hollow female friction cone member, formed with an external belt engaging surface, a male friction cone member projected through said female member and having a nut socket formed in one end, and a spring engaging the male cone member to normally retain the same out of engagement with said female cone member.

In testimony whereof I have affixed my signature in presence of two witnesses.

HELMUTH A. KRUEGER.

Witnesses:
  EDNA J. GOCKEL,
  GLADYS WALTON.